Feb. 17, 1959     O. G. ROME     2,873,808
REVOLVING ORCHARD UNDERBRUSH CUTTER AND SOIL CULTIVATOR
Filed Oct. 3, 1955     3 Sheets-Sheet 1
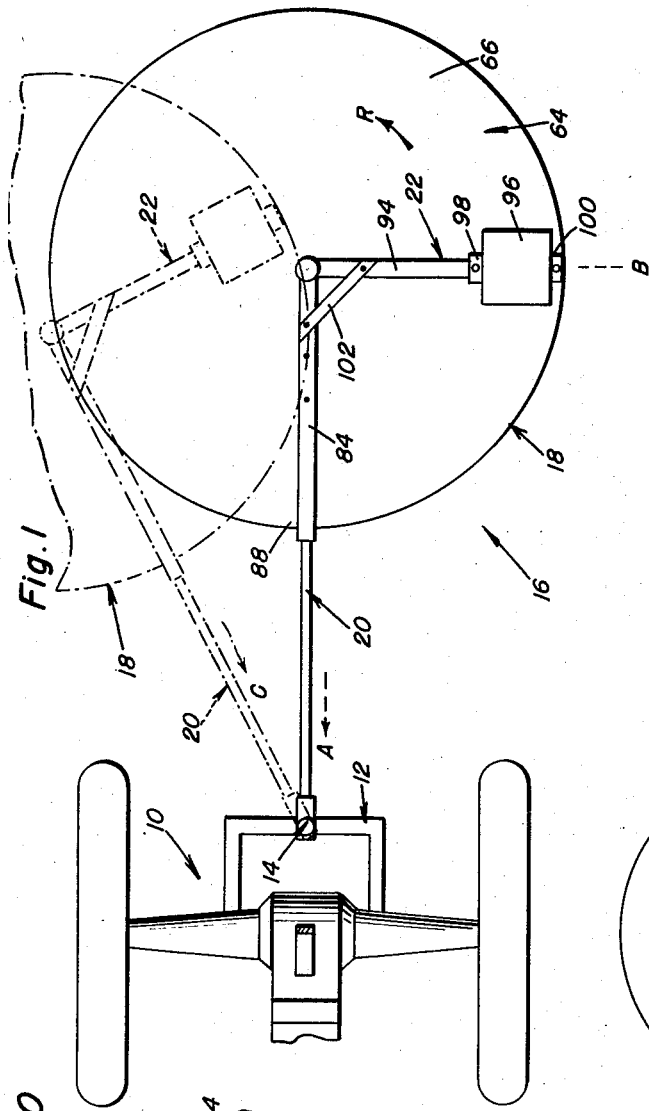
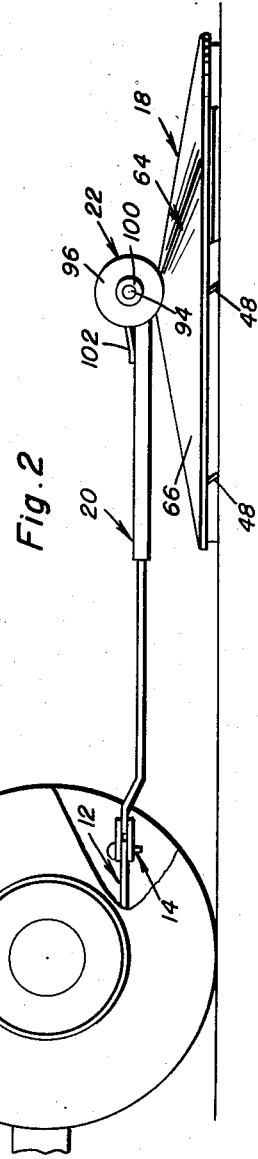
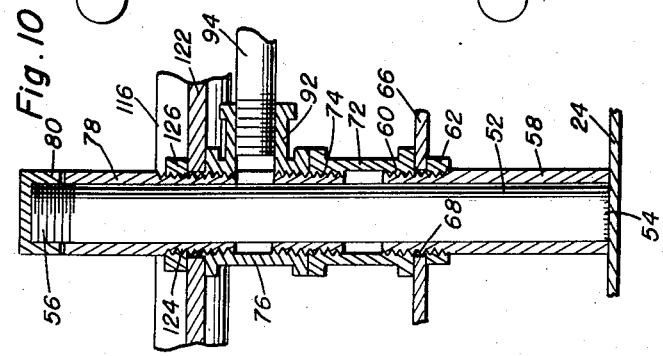
Ollen G. Rome
INVENTOR.

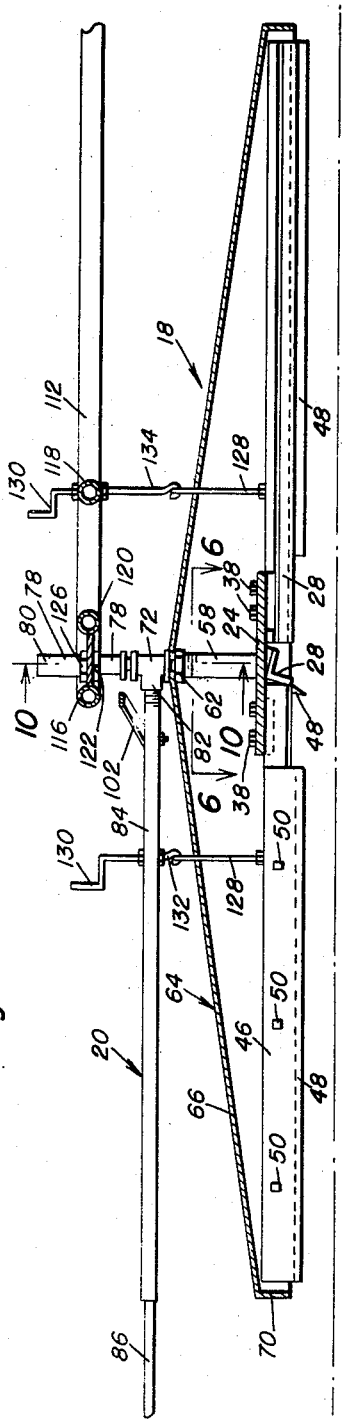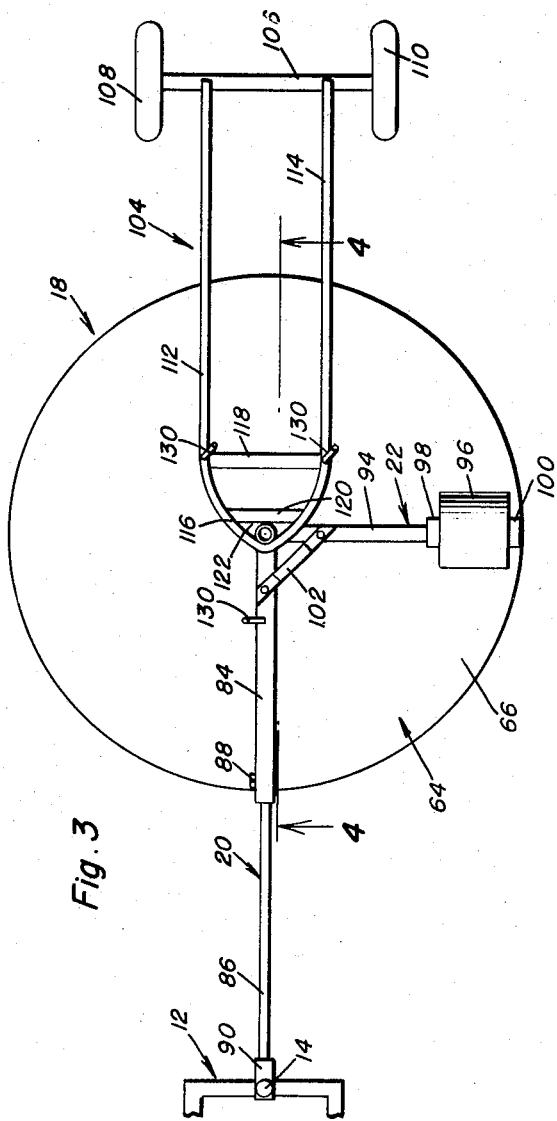

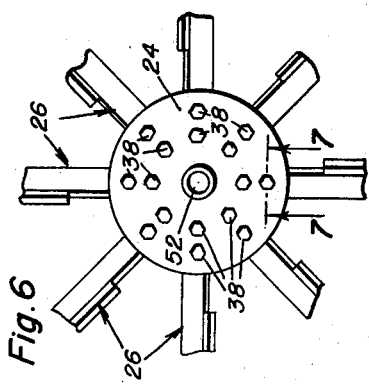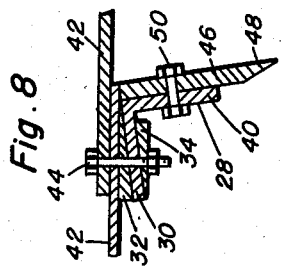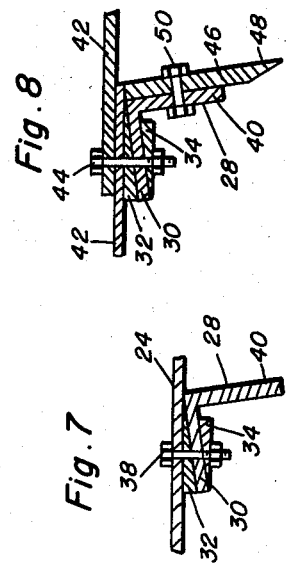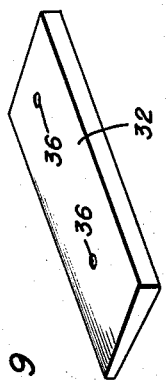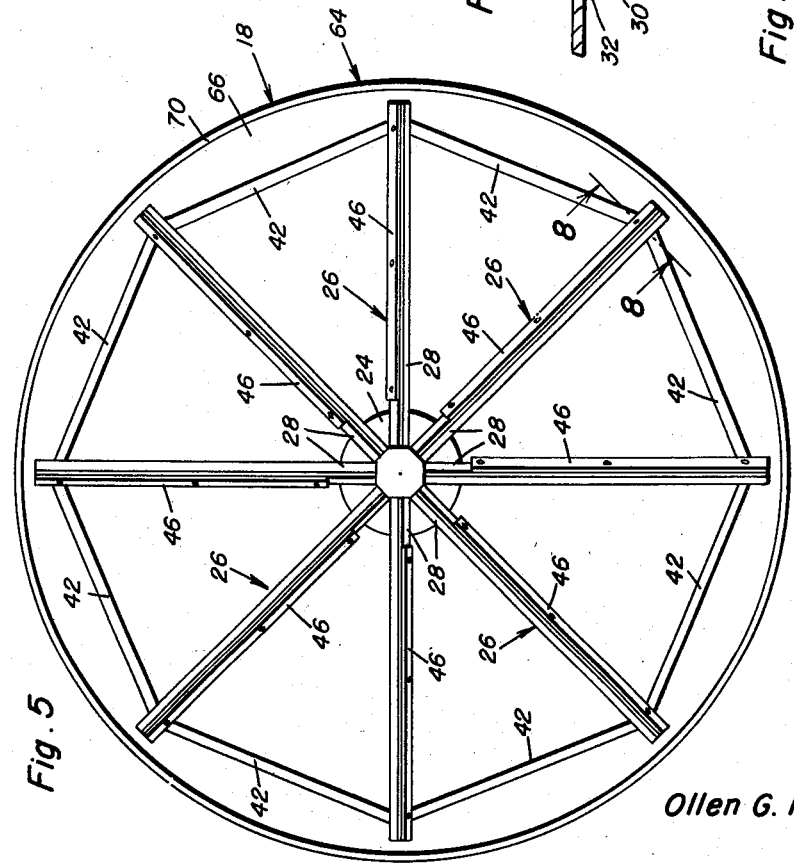
Ollen G. Rome
INVENTOR.

United States Patent Office 2,873,808
Patented Feb. 17, 1959

2,873,808

REVOLVING ORCHARD UNDERBRUSH CUTTER AND SOIL CULTIVATOR

Ollen G. Rome, Mission, Tex.

Application October 3, 1955, Serial No. 538,061

1 Claim. (Cl. 172—524)

This invention relates generally to cultivating implements and is more particularly concerned with a vehicle-drawn cultivating or soil adjusting disk especially usable in orchards and the like for mulching, breaking up capillaries in the soil, sloping the terrain toward the base of fruit trees in the orchard for conserving the water supply therein, etc.

A primary object of the invention in conformity with that set forth above is to provide a vehicle-drawn and adjusting disk which is in free rotatable engagement with the ground being treated and including a plurality of radially, vertically disposed cutter blades, said disk including a vertical integral rotation shaft connected to a longitudinally extensible draft tongue which is pivotally connected at an opposite end to a hitch of the draft vehicle, said cultivating or soil adjusting disk including a radial support rod journaled on said shaft in fixed angular relationship relative to the draft tongue wherein said shaft supports a radially adjustable weight member for applying a peripheral gravity force on said disk whereby the resultant force of the weight member and the force of the draft vehicle on the draft tongue causes said disk to rotate on its vertical rotation shaft and assume an angular relationship relative to the longitudinal direction of travel of said draft vehicle.

Another object of the invention, in conformity with that set forth above, is to provide a transport attachment for the vehicle-drawn cultivating or soil adjusting disk implement of the character set forth, whereby said disk may be transported by said draft vehicle in an elevated non-rotating position by means of a transporting trailer.

A further object of the invention, in conformance with that set forth above, is to provide a cultivating or soil adjusting implement and transporting attachment of the character set forth, which is readily and economically manufactured, easily operated and maintained, and highly efficient and utilitarian for the purpose intended.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1 is a top plan view of the novel soil adjusting or cultivating implement and a fragmentary portion of the draft vehicle showing in phantom lines the position assumed by the soil adjusting or cultivating implement during operation;

Figure 2 is a side elevational view of the soil adjusting or cultivating implement and a fragmentary portion of the draft vehicle;

Figure 3 is a top plan view similar to Figure 1 showing a transport attachment for the soil adjusting or cultivating implement;

Figure 4 is an enlarged sectional view taken substantially on line 4—4 of Figure 3;

Figure 5 is a bottom plan view of the soil adjusting or cultivating disk on a different scale;

Figure 6 is an enlarged fragmentary sectional view of the soil adjusting or cultivating disk taken substantially on line 6—6 of Figure 4;

Figure 7 is an enlarged sectional view of a blade support arm of the cultivating or soil adjusting disk taken substantially on line 7—7 of Figure 6;

Figure 8 is an enlarged sectional view taken substantially on line 8—8 of Figure 5;

Figure 9 is a perspective view of one of a pair of the wedge elements utilized for disposing the soil adjusting or cultivating disk cutter blades in a vertically disposed, angular relationship relative to the plane of rotation of the earth engaging cultivating disk; and Figure 10 is an enlarged sectional view taken substantially on line 10—10 of Figure 4 showing the soil adjusting or cultivating disk shaft and support hub structure thereon.

Indicated generally at 10 is a draft vehicle of any suitable character, such as a conventional tractor, said tractor including conventional rearwardly disposed hitch structure 12 incorporating a centrally disposed vertical pivot portion 14.

Indicated generally at 16 is the novel cultivating or soil adjusting implement which includes a rotary disk assembly 18, an extensible draft tongue 20, and a radially adjustable weight assembly 22.

The cultivating or soil adjusting disk assembly 18 comprises a central securing plate 24 from which extend a plurality of radially disposed cutter blades 26. The blades 26 include L-shaped elongated support members 28 which have an upper leg 30, see Figure 7, disposed in an angular relationship relative to the plate 24 by means of a pair of cooperating angulated wedge elements 32 and 34 which are suitably apertured at 36, see Figure 9, for receiving therethrough fastening bolt assemblies 38, and when the bolt assemblies 38 secure the leg portions 30 in the angular relationship shown in Figure 7, the vertically depending leg 40 and the L-shaped members will be disposed in an angular relationship relative to the plate 24 which generally defines the horizontal plane of rotation of the cultivating disk.

As seen in Figure 8, members 28 have disposed on opposite sides thereof wedge elements 32 and 34 similar to those in Figure 7 and adjacent pairs of members 28 have secured at outer end portions thereof the overlapping ends of elongated brace elements 42, being secured together by means of a suitable bolt assembly 44 and serving to provide a substantially rigid construction. As seen in Figures 4 and 8, the legs 40 of the L-shaped support members 28 have secured thereon in juxtaposed parallel relationship cutter blade elements 46 which include a lower sharpened cutting or soil attacking edge portion 48, said blades being secured to the aforementioned legs 40 by means of a plurality of longitudinally disposed apertures aligned with apertures in the legs 40, a suitable fastening means, such as the bolt assembly 50, extending therethrough.

As most clearly seen in Figure 10, a vertically disposed rotation shaft 52 is secured to the central portion of the support plate 24 by means of welding, as seen at 54, for example, said shaft including an upper threaded portion 56 for a purpose to be subsequently described. A nipple or sleeve 58 is freely journaled on the shaft with the lower end portion adjacent the upper surface of the support plate 24, the upper external circumference of the sleeve element 58 being threaded at 60 and receiving thereon a suitable abutment collar element 62. A protection disk cover member 64, including downwardly opening conical cover portion 66, includes a central aperture 68 which extends over the threaded portion 60 of the sleeve 58 in juxtaposed engagement with the abutment collar 62, said cover member terminating in a right angularly disposed annular flange 70 which extends downwardly over the outer edges of cutter blades 46. A suitable T-shaped hub element 72 includes a lower portion threadedly secured to the threaded portion 60 of the sleeve 58, the lower portion of the T-shaped element clampingly engaging the upper surface portion of the cover 66, see Figure 10, the upper end of said T-shaped element incorporating therein an externally threaded nipple element 74 which is also journaled on the shaft 52, and connected to the nipple element 74 is a second T-shaped hub element 76 which has secured within the upper end thereof the lower threaded end of a sleeve element 78 which is also journaled on the shaft 52. A cap element 80 is secured on the threaded portion 56 of the shaft 52 and thus prevents the accidental removal of the sleeve 58, T-shaped elements 72 and 76 of the sleeve 78 from the shaft 52 when the soil adjusting or cultivating disk is in operation.

The first-mentioned T-shaped hub element 72 is threadedly secured in a right angular leg portion 82, see Figure 4, an elongated tubular member 84 forming a part of the draft tongue assembly 20, said tubular member 84 telescopically receiving a smaller diameter tubular member 86 which is longitudinally adjustable therein by means of a suitable transversely adjustable setscrew 88, for example. The rod or tubular member 86 may include a suitable vertically apertured end portion 90 which is pivotally connected to the vertical pivot portion 14 of the hitch 12 of the draft vehicle 10.

The second T-shaped hub element 76 includes a right angular portion 92 threadedly securing therein a support rod 94 which extends radially from the vertical shaft 62 of the cultivator disk, the rod 94 supporting thereon a weight member 96 which is radially adjustable relative to the vertical shaft 52 by means of suitable clamping collars 98 and 100 circumposed on the rod 94 which permit the weight member 96 to be adjusted toward or away from the outer peripheral circumference of the soil adjusting disk which would be defined by the cutter members 46.

It is to be understood that the cultivating disk is in engagement with the ground being worked upon for free rotation on its shaft 52. The weight member 96 exerts a force downward adjacent the outer periphery of what may be defined as the outer cutting edge of the soil engaging cultivating disk. As the draft vehicle moves forward on its longitudinal axis of travel, the excessive pressure of the weight member 96 on the edge of the soil adjusting disk causes a drag on that side of the disk in the weight member 96, resulting in rotating the disk as seen in the direction of arrow R of Figure 1, and the resultant force of the draft tongue assembly 20 indicated by the dotted arrow A and the tendency of the weight member 96 to retain the edge of the earth engaging disk in a fixed position, which causes the previously mentioned rotation and also results in a force being applied on the disk indicated by the dotted line B, whereupon the resultant force of the two previously mentioned forces causes the cultivating disk to assume the phantom line position of Figure 1 due to the resultant force indicated by the dotted line C. A suitable brace member 102 is suitably secured between the tubular member 84 and the support rod 94, maintaining said members at a substantially right angle with respect to each other.

The trees of the orchard being treated will normally be disposed at the side of the draft vehicle toward which the soil adjusting disk moves. Thus, the trees would be located at the upper portion of Figure 1, it being understood that the cultivating or soil adjusting disk is of a substantially large diameter, say, for example, ten feet, and accordingly the rotation of the cutter elements results in breaking up the soil and the capillaries therein, thus preventing the loss of moisture due to capillary action in evaporation. Underbrush, leaves, twigs, etc. are cut by the cutter blade portions 48, and inasmuch as the cultivating disk is disposed out toward the side of the longitudinal direction of travel of the draft vehicle, rotation of such disk will move the previously mentioned material and earth toward said longitudinal direction of travel, tending to build up the center of the orchard and providing a shallow angular slope toward the base of the trees, thus urging water to flow toward the base of such trees during ordinary rain fall or during irrigation.

The draft or trailer attachment, indicated generally at 104, includes a suitable axle 106 having wheels 108 and 110 journaled on opposite ends thereof in a forwardly extending frame comprised of side frame elements 112 and 114 which are suitably secured to said axle 106 and which have a forward converging end portion 116. Suitable transverse brace elements 118 and 120 are provided between the frame members 112 and 114 in the forwardly converging end 116 of the trailer, and a horizontal plate 122 is disposed between the portion 116 and brace element 120 of said trailer. The plate 122 has a suitable aperture therein which is disposed on the sleeve element 78, said sleeve element 78 having an external threaded portion 124 which accommodates a fastening nut 126 thereon for securing the forward converging end of the trailer in a relatively fixed position with respect to said sleeve 78, T-shaped elements 76 and 72, and the sleeve 58. Suitable vertically disposed eye bolt elements 128 are suitably secured to the upper legs of the L-shaped cutter support members which extend radially from the plate 24 (said construction not being shown), and the tubular member 84 and the frame members 112 and 114 of the draft tongue assembly 20 and trailer 104, respectively, each supports a vertically adjustable crank assembly 130 of any suitable character which includes downwardly depending, freely pivoted hook portions 132 and 134 engageable with the eye bolts 128 and, accordingly, upon upward movement of the portions 132 and 134, rotation of the cultivator disk assembly will be prevented and said disk assembly will be raised off the ground, see Figure 4.

It will be noted that the adjustable or extensible draft tongue assembly 20 will result in the cutter disk assembly 18, see Figure 1, in moving rearwardly and, accordingly, more closely to the base or trunks of the trees when disposed in the angular relationship shown by the phantom lines.

Various positional directional terms such as "front," "rear," "top," etc. are utilized herein to have only a relative connotation to aid in describing the device and are not intended to require any particular orientation with any external elements. The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

For use with a draft vehicle having a hitch, a rotary soil adjusting implement for providing a lateral pitch in the ground relative to the direction of travel of the implement, said implement comprising a rotary soil adjusting disk including a plurality of vertically disposed radial cutting blades, said blades having a flat upper leg secured to said disk and a depending leg fixed to one edge of said upper leg, said depending leg pitched in angular relationship to the horizontal plane of rotation when said disk is in a horizontal position, an upwardly extending vertical shaft fixedly secured at the center of said disk, an elongated draft tongue journaled at one end to said shaft, the other end of said draft tongue including a freely pivoted connection on said hitch, an elongated support rod journaled at one end on said vertical shaft, brace means extending between said draft tongue and support rod maintaining said tongue and rod in a fixed angular relationship, a weight member adjustably secured on the distal end of said rod in overlying relationship to the outer peripheral edge of said soil adjusting disk tending to urge the underlying portion of said disk into engagement with the ground, the resultant force of the peripheral drag applied on the outer periphery of said soil adjusting disk by said weight member and the force on the draft tongue imposed by the draft vehicle tending to rotate said disk about the vertical shaft and to pivot said disk about the pivot portion of the hitch on the draft vehicle in angular relationship relative to the direction of travel of said implement.

References Cited in the file of this patent

UNITED STATES PATENTS

| | | |
|---|---|---|
| 835,537 | Keen | Nov. 13, 1906 |
| 1,134,639 | Richard | Apr. 6, 1915 |
| 2,560,909 | Thompson | July 17, 1951 |
| 2,679,130 | Bennett et al. | May 25, 1954 |
| 2,706,880 | Steuerwald | Apr. 26, 1955 |

FOREIGN PATENTS

| | | |
|---|---|---|
| 1,939 | Great Britain | Aug. 25, 1859 |